United States Patent Office 2,876,235
Patented Mar. 3, 1959

2,876,235

BASIC AMIDES OF 3-THIANAPHTHENE-CARBOXYLIC ACID

Walter Voegtli, Basel, Switzerland, assignor to G. D. Searle & Co., Chicago, Ill., a corporation of Delaware No Drawing. Application December 3, 1956
Serial No. 625,611

4 Claims. (Cl. 260—330.5)

The present invention is concerned with basic amides of 3-thianaphthenecarboxylic acid and with non-toxic salts thereof. More particularly, it is concerned with compositions which, in the forms of their free bases, can be represented by the structural formula

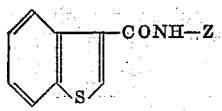

In this formula the term Z can represent a lower dialkylaminoalkyl radical or a pyridyl radical. By the expression "lower dialkylaminoalkyl" there is meant an organic radical of the structural formula

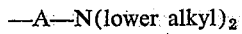

—A—N(lower alkyl)$_2$ wherein the lower alkyl groups can be selected from among straight- and branched-chain alkyl radicals having fewer than 9 carbon atoms, and A is a straight- or branched-chain alkylene group having fewer than 9 carbon atoms and preferably separating the groups attached thereto by at least two carbon atoms. The group A can consequently represent such polymethylene radicals as ethylene, trimethylene, tetramethylene, pentamethylene, hexamethylene, heptamethylene and octamethylene, as well as isomeric propylene, butylene, amylene, hexylene, heptylene, and octylene radicals. Pyridyl radicals encompassed by the term Z include 2-pyridyl, 3-pyridyl and 4-pyridyl.

In the manufacture of compositions of this invention, 3-thianaphthenecarboxylic acid of the structural formula

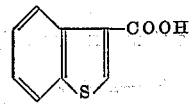

is converted to the acid chloride, which is then reacted, suitably in an ethereal or hydrocarbon medium, with a diamine such as a dialkylaminoalkylamine or an aminopyridine. The amide which is the reaction product can be obtained directly as its hydrochlcride, or after basification with a reagent such as potassium carbonate or sodium hydroxide, as the free base.

The free bases of this invention can sometimes be obtained as crystallizable solids, and sometimes as high-boiling oils which can be subjected to purification by distillation in a short-path distillation apparatus at pressures of approximately 0.02 mm.

The organic bases of this invention form acid-addition and quaternary ammonium salts, non-toxic except as hereinafter disclosed, with a variety of organic and inorganic salt-forming reagents. Thus, acid-addition salts, formed by admixture of the organic free base with an acid, suitably in a neutral solvent, are formed with such acids as sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids. Quaternary ammonium salts can be formed by reaction of the free bases with a variety of organic esters of sulfuric hydrohalic, and aromatic sulfonic acids. The organic esters employed for quaternary ammonium salt formation are desirably lower alkyl halides, and alkylene halohydrins such as ethylene bromohydrin. However, other organic esters are suitable for salt formation, and can be selected from among a diverse class of compounds including benzyl chloride, phenethyl chloride, naphthylmethyl chloride, dimethyl sulfate, methyl benzenesulfonate, ethyl toluenesulfonate, allyl chloride, methallyl bromide and crotyl bromide. For the purposes of this invention the free bases are equivalent to their non-toxic acid-addition and quarternary ammonium salts.

The compositions of this invention have valuable pharmacological properties, as shown by their effects on the cardiovascular system. They are anti-hypertensive agents, and are effective in reducing elevated blood pressure. They are also effective in the treatment of cardiac arrhythmias, and, like quinidine, can be employed in normalizing atrial flutter and atrial fibrillation. One of the advantages of the compositions claimed herein is that they are relatively non-toxic to higher forms of life; they do, however, display toxicity toward lower forms of life, and can consequently be employed as anti-fungal agents. Thus, they are effective by topical application in inbibiting the growth of *Trichophyton mentagrophytes*.

This invention will appear more fully from the examples which follow. These examples are set forth by way of illustration only, and it will be understood that the invention is not to be construed as limited in spirit or in scope by the details contained therein, as many modifications in materials and methods will be apparent from this disclosure to those skilled in the art. In these examples temperatures are given in degrees centigrade (° C.), distillation pressures in millimeters (mm.) of mercury, and quantities of materials in parts by weight.

*Example 1*

A solution of 4 parts of 3-thianaphthenecarboxylic acid in 65 parts of thionyl chloride is allowed to stand at about 25° C. for 18 hours and is then heated under reflux for 2 hours. The thionyl chloride is removed by distillation under reduced pressure, following which at least two separate portions of anhydrous benzene of about 10 parts each are added to the residue and likewise removed by vacuum distillation. The non-volatile residue readily crystallizes, and is 3-thianaphthenecarbonyl chloride which is suitable for use without further purification. The structural formula is

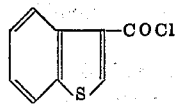

*Example 2*

To a stirred solution of 6.6 parts of 3-thianaphthenecarbonyl chloride in 110 parts of anhydrous ether, cooled with an external ice bath, there is added a solution of 4.3 parts of 3-diethylaminopropylamine in 110 parts of anhydrous ether over a period of about 30 minutes. The reaction mixture is stirred at room temperature for an additional 3 hours, and then allowed to stand for about 20 hours. The insoluble product is then collected on a filter and washed with ether. An aqueous solution of this product is rendered basic with saturated potassium carbonate solution and extracted with several portions of chloroform. The combined chloroform extract is washed with water, and concentrated to dryness by distillation of the solvent under reduced pressure, finally at a temperature of about 125° C. at a pressure of about 20 mm. The viscous, red oil which remains is crude N-(3-diethylaminopropyl)-3-thianaphthenecarboxamide. In a short-path distillation apparatus it is obtained as a yellow oil which boils at about 175–180° C. at 0.02 mm. The structural formula is

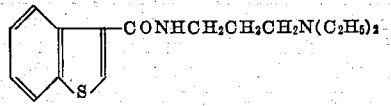

By the foregoing procedure, with the substitution of 3.4 parts of 3-dimethylaminopropylamine for the 3-diethylaminopropylamine, the compound obtained is N-(3-dimethylaminopropyl)-3-thianaphthenecarboxamide.

A methobromide is obtained from each of the foregoing dialkylaminoalkylamides by treating a chloroform solution of 1.8 parts of the free base with 0.6 part of methyl bromide, heating the reaction mixture in a sealed vessel at about 70° C. for 20 hours, and removing the chloroform by vaporization.

Example 3

A solution of N-(3-diethylaminopropyl)-3-thianaphthenecarboxamide in acetone is treated with a slight excess of hydrogen chloride in isopropyl alcohol, and crystallization is induced. The solid product is collected on a filter and washed with acetone and then with ether. This compound is N-(3-diethylaminopropyl)-3-thianaphthenecarboxamide hydrochloride which melts at about 151–152° C.

Example 4

To a stirred solution of 4.4 parts of 3-thianaphthenecarbonyl chloride in 70 parts of anhydrous ether, kept cool with an external ice bath, there is added a solution of 3.5 parts of 5-diethylamino-2-pentylamine in 70 parts of anhydrous ether over a period of about 30 minutes. The mixture is stirred at about 25° C. for an additional 4 hours, after which the reaction product is dissolved by extraction with several portions of water. The separated aqueous solution is rendered basic with saturated potassium carbonate solution, and the organic base which forms is extracted with several portions of chloroform. The combined chloroform extract is washed with water and concentrated to dryness by distillation of the solvent under reduced pressure, finally at a temperature of about 140° C. at a pressure of about 20 mm. The product which remains is crude N-(5-diethylamino-2-pentyl)-3-thianaphthenecarboxamide which has the structural formula

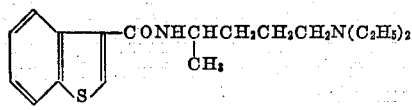

This free base affords a water-soluble salt by treatment with aqueous citric acid.

Example 5

To a stirred solution of 4.4 parts of 3-thianaphthenecarbonyl chloride in 70 parts of anhydrous ether, kept cool with an external ice bath, there is added a solution of 2.2 parts of 3-aminopyridine in 70 parts of anhydrous ether over a period of about 30 minutes. A yellow, insoluble product begins to separate almost immediately. The mixture is stirred at about 25° C. for an additional 2 hours; 100 parts of water is added, and the ether is removed by decantation and discarded. There is then added 40 parts of methanol and 200 parts of water, and, with vigorous stirring, the mixture is made basic with saturated potassium carbonate solution. This operation causes the formation of an oily product, which quickly tends to harden. This oily or solidified product is dissolved by extraction with several portions of chloroform, and the combined chloroform extract is washed with water, dried over potassium carbonate, filtered and distilled to dryness. The residue obtained is a yellow oil which readily crystallizes. Upon recrystallization from aqueous isopropyl alcohol, there is obtained N-(3-pyridyl)-3-thianaphthenecarboxamide which melts at about 139–140° C. and has the structural formula

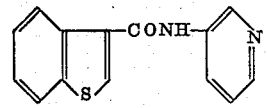

By the foregoing procedure, with the substitution of 2.2 parts of 4-aminopyridine for the 3-aminopyridine, the compound obtained is N-(4-pyridyl)-3-thianaphthenecarboxamide.

Example 6

A solution of 2 parts of N-(3-pyridyl)-3-thianaphthenecarboxamide in 12 parts of ethanol is treated with a slight excess over 1 molecular equivalent of hydrogen chloride in isopropyl alcohol. A crystalline product begins to separate almost immediately. Acetone (about 25 parts) is added, and the product is collected on a filter and washed with acetone and with ether. This compound is N-(3-pyridyl)-3-thianaphthenecarboxamide hydrochloride which melts at about 249–252° C. after prior softening.

In the same manner the hydrobromide is obtained by treatment of an ethanolic solution of the free base with approximately one molecular equivalent of hydrogen bromide in isopropyl alcohol.

Example 7

A reaction mixture prepared by adding 2 parts of methyl iodide to a solution of 1 part of N-(3-pyridyl)-3-thianaphthenecarboxamide in 8 parts of acetone is allowed to stand at about 25° C. for 18 hours. The crystalline product is collected on a filter and washed with acetone and with petroleum ether. It is recrystallized by suspending it in about 35 parts of refluxing methanol, adding a small quantity of water to effect substantially complete solution, and allowing the filtered solution to cool. There is in this manner obtained N-(3-pyridyl)-3-thianaphthenecarboxamide methiodide which melts at about 253–255° C.

What is claimed is:
1. A compound of the structural formula

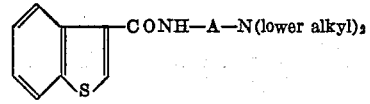

wherein A is a lower alkylene radical separating the groups attached thereto by at least two carbon atoms.

2. N - (3 - diethylaminopropyl) - 3 - thianaphthenecarboxamide.
3. N - (3 - dimethylaminopropyl) - 3 - thianaphthenecarboxamide.
4. N - (5 - diethylamino - 2 - pentyl) - 3 - thianaphthenecarboxamide.

References Cited in the file of this patent

Wegler et al.: Chem. Abstracts, vol. 32, column 939 (1938).

Shirley et al.: Chem. Abstracts, vol. 47, columns 9958–9 (1953).